(12) United States Patent
Wilkes

(10) Patent No.: US 8,751,376 B1
(45) Date of Patent: Jun. 10, 2014

(54) FINANCIAL INSTRUMENT HAVING CREDIT AND PRE-PAID CHARACTERISTICS

(75) Inventor: T. Clay Wilkes, North Salt Lake, UT (US)

(73) Assignee: Galileo Processing, Inc., Salt Lake City, UT (US)

( * ) Notice: Subject to any disclaimer, the term of this patent is extended or adjusted under 35 U.S.C. 154(b) by 459 days.

(21) Appl. No.: 12/560,072

(22) Filed: Sep. 15, 2009

Related U.S. Application Data

(60) Provisional application No. 61/097,050, filed on Sep. 15, 2008, provisional application No. 61/158,652, filed on Mar. 9, 2009.

(51) Int. Cl.
G06Q 40/00 (2012.01)
(52) U.S. Cl.
USPC .................. 705/38; 705/35; 705/39
(58) Field of Classification Search
USPC ....................................... 705/35, 39
See application file for complete search history.

(56) References Cited

U.S. PATENT DOCUMENTS

| | | | |
|---|---|---|---|
| 6,816,721 B1 * | 11/2004 | Rudisill | 455/406 |
| 7,072,864 B2 * | 7/2006 | Brake et al. | 705/41 |
| 7,401,731 B1 * | 7/2008 | Pletz et al. | 235/380 |
| 7,850,070 B2 * | 12/2010 | Constantine | 235/375 |
| 2002/0123965 A1 * | 9/2002 | Phillips | 705/41 |
| 2003/0125011 A1 * | 7/2003 | Campbell | 455/406 |
| 2005/0077350 A1 * | 4/2005 | Courtion et al. | 235/380 |
| 2005/0080672 A1 * | 4/2005 | Courtion et al. | 705/14 |
| 2005/0091153 A1 * | 4/2005 | Monk | 705/39 |
| 2005/0242193 A1 * | 11/2005 | Smith et al. | 235/487 |
| 2006/0065741 A1 * | 3/2006 | Vayssiere | 235/492 |
| 2006/0165060 A1 * | 7/2006 | Dua | 370/352 |
| 2007/0136194 A1 * | 6/2007 | Sloan | 705/41 |
| 2007/0228157 A1 * | 10/2007 | Eckert | 235/380 |
| 2008/0195438 A1 * | 8/2008 | Manfredi et al. | 705/7 |
| 2011/0218891 A1 * | 9/2011 | Sjelvgren et al. | 705/30 |

OTHER PUBLICATIONS financefreelancelife.com http://financefreelancelife.com/2008/07/28/how-credit-card-companies-apply-your-payments/ How Credit Card Companies Apply Your Payments.*

* cited by examiner

*Primary Examiner* — William Rankins
(74) *Attorney, Agent, or Firm* — Maschoff Brennan

(57) ABSTRACT

Embodiments of the present invention provide for methods and systems for providing a financial instrument that possesses both credit features (secured and unsecured) and pre-paid features. When a purchase is made using a financial instrument linked to an account, funds are first drawn from a line of credit until a credit limit is reached. Any additional funds required to make the purchase are then drawn from a secured account, such as a prepaid cash balance. In some embodiments, the additional funds are automatically drawn form the prepaid cash balance while in other embodiments an account holder manually transfers funds from the prepaid cash balance to the credit balance.

10 Claims, 7 Drawing Sheets

200

| Starting Point | Day 1 |
|---|---|
| Credit Limit | $50.00 |
| Prepaid Account | $100.00 |
| Pending Transactions | 0.00 |
| Credit OTB | $50.00 |
| Prepaid OTB | $100.00 |
| Pending OTB | 0.00 |
| Bucket Balance | 0.00 |
| Card Holder OTB | $150.00 |

| Simple Purchase | Day 1 | Day x |
|---|---|---|
| Credit Limit | $50.00 | |
| Prepaid Account | $100.00 | |
| Pending Transactions | 0.00 | |
| Purchase Authorization | $10.00 | |
| Settlement | | $10.00 |
| Credit OTB | $40.00 | $40.00 |
| Prepaid OTB | $100.00 | $100.00 |
| Pending OTB | 0.00 | 0.00 |
| Bucket Balance | 0.00 | $10.00 |
| Card Holder OTB | $140.00 | $140.00 |

| Transaction With Merchant Credit | Day 1 | Day x | Day y | Day z |
|---|---|---|---|---|
| Credit Limit | $50.00 | | | |
| Prepaid Account | $100.00 | | | |
| Pending Transactions | 0.00 | | | |
| Purchase Authorization | $10.00 | | | |
| Purchase Settles | | $10.00 | | |
| Merchant Credit Authorization | | | $10.00 | |
| Merchant Credit Settles | | | | $10.00 |
| Credit OTB | $40.00 | $40.00 | $40.00 | $50.00 |
| Prepaid OTB | $100.00 | $100.00 | $100.00 | $100.00 |
| Pending OTB | 0.00 | 0.00 | $10.00 | 0.00 |
| Bucket Balance | 0.00 | $10.00 | $10.00 | 0.00 |
| Card Holder OTB | $140.00 | $140.00 | $140.00 | $150.00 |

| Transaction With Merchant Credit, Plus Payment On Account | Day 1 | Day x | Day y | Day z |
|---|---|---|---|---|
| Credit Limit | $50.00 | | | |
| Prepaid Account | $100.00 | | | |
| Pending Transactions | 0.00 | | | |
| Purchase Authorization | $19.50 | | | |
| Purchase Settles | | $19.50 | | |
| Merchant Credit Authorization | | $12.50 | | |
| Merchant Credit Settles | | | $12.50 | |
| Payment On Account | | | | $10.00 |
| Credit OTB | $30.50 | $30.50 | $43.00 | $50.00 |
| Prepaid OTB | $100.00 | $100.00 | $100.00 | $103.00 |
| Pending OTB | 0.00 | $12.50 | 0.00 | 0.00 |
| Bucket Balance | 0.00 | $19.50 | $7.00 | 0.00 |
| Card Holder OTB | $130.50 | $130.50 | $143.00 | $153.00 |

| Transaction Settlement Above Authorization | Day 1 | Day x |
|---|---|---|
| Credit Limit | $50.00 | |
| Prepaid Account | $100.00 | |
| Pending Transactions | 0.00 | |
| Purchase Authorization | $47.50 | |
| Settlement | | $53.50 |
| Credit OTB | $2.50 | 0.00 |
| Prepaid OTB | $100.00 | $96.50 |
| Pending OTB | 0.00 | 0.00 |
| Bucket Balance | 0.00 | $50.00 |
| Card Holder OTB | $100.00 | $96.50 |

| Large Transactions With Pending Merchant Credit Or Payment | Day 1 | Day x | Day y | Day z |
|---|---|---|---|---|
| Credit Limit | $50.00 | | | |
| Prepaid Account | $100.00 | | | |
| Pending Transactions | 0.00 | | | |
| Purchase Authorization | $60.00 | | $50.00 | |
| Purchase Settles | | $60.00 | | $50.00 |
| Pending Merchant Credit Or Pending Payment | | | $40.00 | |
| Posted Merchant Credit Or Payment | | | | $40.00 |
| Payment On Account | | | | |
| Credit OTB | ($10.00) | 0.00 | ($50.00) | 0.00 |
| Prepaid OTB | $100.00 | $90.00 | $90.00 | $80.00 |
| Pending OTB | 0.00 | $0.00 | $40.00 | 0.00 |
| Bucket Balance | 0.00 | $50.00 | $10.00 | $50.00 |
| Card Holder OTB | $90.00 | $90.00 | $40.00 | $80.00 |

| Transactions With Pending Payment | Day 1 | Day x | Day y | Day z |
|---|---|---|---|---|
| Credit Limit | $50.00 | | | |
| Prepaid Account | $100.00 | | | |
| Pending Transactions | 0.00 | | | |
| Pending Posts | | | | $60.00 |
| Purchase Authorization | $130.00 | $20.00 | | |
| Purchase Settles | | $160.00 | $20.00 | |
| Merchant Credit Authorization | | | | |
| Merchant Credit Settles | | | | |
| Payment On Account | | $60.00 | | |
| Credit OTB | ($80.00) | 0.00 | 0.00 | $30.00 |
| Prepaid OTB | $100.00 | 0.00 | 0.00 | 0.00 |
| Pending OTB | 0.00 | $30.00 | $30.00 | 0.00 |
| Bucket Balance | 0.00 | $50.00 | $50.00 | $20.00 |
| Card Holder OTB | $20.00 | 0.00 | 0.00 | $30.00 |

| Transactions With Pending Payment And Pending Credit | Day 1 | Day x | Day y | Day z |
|---|---|---|---|---|
| Credit Limit | $50.00 | | | |
| Prepaid Account | $100.00 | | | |
| Pending Transactions | 0.00 | | | |
| Pending Posts | | | $20.00 | $12.50 |
| Purchase Authorization | $130.00 | $20.00 | | |
| Purchase Settles | | $160.00 | $20.00 | |
| Merchant Credit Authorization | | | $12.50 | |
| Merchant Credit Settles | | | | |
| Payment On Account | | $20.00 | | |
| Credit OTB | ($80.00) | 0.00 | 0.00 | 0.00 |
| Prepaid OTB | $100.00 | 0.00 | 0.00 | $2.50 |
| Pending OTB | 0.00 | 0.00 | $2.50 | 0.00 |
| Bucket Balance | 0.00 | $60.00 | $50.00 | $50.00 |
| Card Holder OTB | $20.00 | 0.00 | 0.00 | $2.50 |

*Figure 9*

FINANCIAL INSTRUMENT HAVING CREDIT AND PRE-PAID CHARACTERISTICS

CROSS-REFERENCE TO RELATED APPLICATIONS

This application claims the benefit of U.S. Provisional Patent Application Ser. No. 61/097,050 entitled FINANCIAL INSTRUMENT HAVING CREDIT AND PRE-PAID CHARACTERISTICS, filed Sep. 15, 2008, which is incorporated herein in its entirety by this reference. This application also claims the benefit of U.S. Provisional Patent Application Ser. No. 61/158,652 entitled FINANCIAL INSTRUMENT HAVING UNSECURED CREDIT AND PRE-PAID CHARACTERISTICS, filed Mar. 9, 2009, which is incorporated herein in its entirety by this reference.

BACKGROUND

1. The Field of the Invention

The present invention relates generally to financial instruments. More specifically, the present invention relates to methods and systems for a financial instrument having both credit (secured and unsecured) and pre-paid characteristics.

2. The Relevant Technology

Financial instruments, and particularly financial cards, are typically divided into two categories. First, prepaid or debit instruments provide an alternative payment method to cash when making purchases. When making a purchase with a prepaid instrument, such as a debit card, the debit card holder is typically required to have a cash balance in an account associated with the debit card that exceeds the purchase amount. A debit card is often referred to as a check card because funds used to make a purchase are typically withdrawn directly from the cardholder's bank account.

Second, credit instruments involve the granting of a loan and the creation of debt. A credit card is different from a debit card in that it does not remove money from the user's account after every transaction. Instead, the credit card issuer lends money to the consumer when a purchase is made, and the user is required to repay the borrowed amount plus interest.

Seldom does a single financial instrument combine the characteristics of both credit and pre-paid accounts. One example of a financial instrument having both credit and pre-paid characteristics is a bank account (e.g., a checking account linked to a debit card) that is associated with an overdraft protection account. In an overdraft protection account, an account owner typically maintains a cash balance with a financial institution and purchases are withdrawn from the cash balance. If the account owner makes a purchase or other withdrawal from the account that exceeds the cash balance of the account, the financial institution will automatically fund the remaining portion of the purchase or withdrawal by drawing on a line of credit (i.e., the overdraft account) that is associated with the account owner's primary account. The account owner is then required to repay the amount borrowed from the overdraft protection account.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide for methods and systems for providing a financial instrument that possesses both credit (secured and unsecured) features and pre-paid features. When a purchase is made using a financial instrument linked to an account, funds are first drawn from a line of credit until a credit limit is reached. Any additional funds required to make the purchase are then drawn from a prepaid cash balance or a secured account.

Embodiments of the present invention also provide for methods and systems for providing a financial instrument that possesses both unsecured credit features and prepaid features. A user may obtain an unsecured credit account, typically for a low credit amount. The user may also obtain a prepaid cash account that is tied to the unsecured credit account. A purchase may be made using a financial instrument linked to the unsecured credit account, until a credit limit is reached. If a purchase requires an amount that exceeds the credit limit, the user may manually move the excess amount from the cash account to the unsecured credit account.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2 illustrates an example transaction in accordance with the embodiments disclosed herein;

FIG. 3 illustrates an example transaction in accordance with the embodiments disclosed herein;

FIG. 4 illustrates an example transaction in accordance with the embodiments disclosed herein;

FIG. 5 illustrates an example transaction in accordance with the embodiments disclosed herein;

FIG. 6 illustrates an example transaction in accordance with the embodiments disclosed herein;

FIG. 7 illustrates an example transaction in accordance with the embodiments disclosed herein;

FIG. 8 illustrates an example transaction in accordance with the embodiments disclosed herein;

FIG. 9 illustrates an example transaction in accordance with the embodiments disclosed herein;

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention provide for methods and systems for providing a financial instrument that possesses both credit features and prepaid features. When a purchase is made using a financial instrument linked to an account, funds are first drawn from a line of credit until a credit limit is reached. Any additional funds required to make the purchase are then drawn from a separate account, such as a prepaid cash balance.

Figure 1:
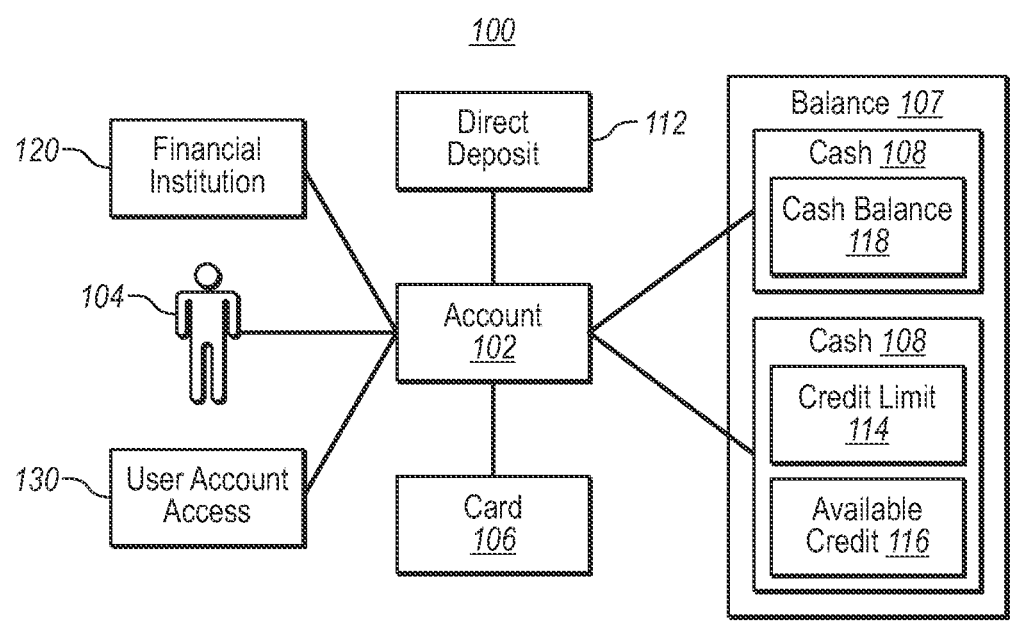
FIG. 1 illustrates a financial system in which the embodiments disclosed herein may be practiced.

Referring now to FIG. 1, a more detailed example is illustrated using a diagrammed reference to the financial system 100, including a financial account 102. The financial account 102 may be linked to a financial instrument, such as a card 106. Although the present example includes card 106 that may be used for accessing funds within the account 102, other mechanisms may also be employed for accessing the account funds, such as checks, online account access, and the like.

The account 102 may also be linked to a direct deposit mechanism 112 and account balances 107. In accordance with the present invention, the account balances 107 may be divided into a cash portion 108 and a credit portion 110. The cash portion 108 may store a cash balance 118, and the credit portion 110 may store a credit limit 114 and an available credit 116. When an account holder 104 opens an account, the account holder 104 pays a cash deposit which is deposited into the cash balance 118. In one embodiment, a financial institution 120 managing the account 102 may require that the account holder 104 pay a minimum amount prior to opening an account 102. In another embodiment, the minimum amount required of each account holder 104 may differ depending on various factors, including credit scores, income levels, occupation, and the like. That is, the required amount may vary for each account holder depending on the account holder's financial situation and past credit use.

Upon opening the account 102, a line of credit or credit limit 114 is provided to the account holder. The amount of the credit limit 114 may also vary depending for each user. In one embodiment, the amount of credit will typically be small, such as $50, for an account holder 104 who has no prior credit history or who has a poor credit history.

For example, in some embodiments credit score modeling using such factors as credit history, income levels, occupation, and the like may be used to determine how much, if any, the credit limit 114 should be. Thus, an account holder 104 with a higher credit score would typically receive a higher credit limit 114 than an account holder 104 with a lower credit score. As will be appreciated, a higher credit score will typically mean there is less risk to the financial institution 120 in providing the credit limit 114. However, because additional security may be provided by the cash deposit stored in the cash balance 108, the account 102 may be opened with less reliance on factors such as credit scores and income levels.

Of course, as will also be appreciated, many potential account holders 102 may not have sufficient credit scores as determined by the credit modeling to qualify for the line of credit 114. Alternatively, the financial institution 120 may not desire to perform credit modeling on all potential account holders 104. In such embodiments, approval of the line of credit 114 may be given when the direct deposit mechanism 112 is configured for the direct deposit of a portion of a periodic paycheck into the account 102. In this way there is less risk to the financial institution 120 in providing the credit limit 114 as repayment of the line of credit 114 will automatically happen via the direct deposit mechanism 112. Of course, it will be appreciated that other criteria or models than credit modeling and direct deposit may be used to determine if the line of credit 114 should be issued to the account holder 104.

The account 102 is configured such that when the account holder 104 attempts to make a purchase using the financial instrument or card 106, thereby generating a purchase authorization for a given amount, a determination is first made as to whether the available credit 116 stored in the credit portion 110 is sufficient to fund the requested amount for the purchase. If the purchase amount can be funded by the available credit 116 (i.e., without exceeding the credit limit 114), the purchase is funded in a similar manner as a traditional credit card, and the amount of the purchase is deducted from the available credit 116 stored in the credit portion 110. That is, the amount of the purchase is paid directly by financial institution 120 to the merchant, with the account holder 104 being required at a subsequent date to pay back the purchase amount along with interest to the financial institution 120.

On the other hand, if the purchase amount exceeds the available credit 116 (i.e., the purchase cannot be made without exceeding the credit limit 114), then the funds from the prepaid cash portion 108 may be used to at least partially fund the transaction. For example, the credit portion 110 may be used to fund the purchase amount up until the credit limit 114 is reached (i.e., the entire amount of the available credit 116 is used). Any remaining funds needed may then be drawn from the cash balance 118. Once the credit limit 114 has been reached, any subsequent purchases or withdrawals from the account 102 may then be drawn directly from the cash balance 118 until the cash balance is depleted, or until the account holder 104 makes a payment to replenish the available credit. In one embodiment, the funds from the cash account 108 may be moved automatically or by the cardholder to the credit balance prior to making the purchase such that the purchase is made entirely from the credit account 110. As will be appreciated, the determination of which funds or combination of funds (funds in credit portion 110 and/or cash portion 108) is used fund the purchase transaction is performed at the financial institution 120 and is transparent to the merchant. That is, when the account holder 104 makes the purchase with the card 106, the merchant is paid the full purchase price directly by the financial institution 120 in a similar manner as a traditional credit card transaction.

In one embodiment, the financial institution 120 may require that a minimum cash balance 118 be maintained. For example, purchases and withdrawals may be disabled after the cash balance 118 drops below a predetermined level. By requiring that a minimum cash balance 118 be maintained, the financial institution 120 maintains an additional level of security in the event that the account owner 104 does not pay off the balance used in the credit portion 110 of the account 102.

Payments received from the account owner 104 may be applied to the cash portion 108 and credit portion 110 in a number of ways. For example, in one embodiment, at least a portion of the received payment is first applied to the cash balance 118 until it reaches a predetermined minimum amount. Any remaining amount from the received payment is applied to the balance of the credit portion 110 of the account 102 and/or to the cash portion 108 of the account 102. In another embodiment, the account holder may specify how payments are divided between the cash and the credit portions 108 and 110. In yet another embodiment, the payment is applied first to pay at least a minimum payment amount towards the credit portion 110, and a remaining portion may be applied to increase the cash balance 118 and/or pay off the balance of the credit portion 110.

Because of the complexity of combining both credit features and prepaid features into a single account, various additional transfers may be required to perform any given transaction. FIGS. 2-9 provide additional detail regarding the types of transfers and account management that may occur in order to complete a transaction. FIGS. 2-9 are provided by way of illustration and not limitation. The examples of FIGS. 2-9 merely provide a limited number of examples in which financial transactions may be handled. Various other techniques for transferring funds between different account balances may be employed in addition to those described below, while maintaining the principle that transactions are first funded from credit if available, and are then funded from cash.

Referring now to FIG. 2, an example 200 is provided to illustrate the balances that may exist in the various portions 108 and 110 of the account 102. In the present invention, a prepaid cash balance includes $100.00, and a credit limit of $50.00 is also provided to the account owner 104. Because no purchases have been made to reduce the available credit or cash balance, the available credit (referred to hereinafter as "Credit OTB") is $50.00, the available cash (referred to hereinafter as "Prepaid OTB") is $100.00, and the total funds that are available to the account owner (referred to hereinafter as "Cardholder OTB") is $150.00.

Referring now to FIG. 3, an example 300 is provided to illustrate the movement of funds between different balances of the account 102 during a financial transaction where a single purchase takes place. As illustrated, a purchase authorization is made for $10.00. Because the purchase can be funded with the available credit, the "Credit OTB" is reduced from the original amount of $50.00 to $40.00, thereby reducing the Cardholder OTB to $140.00. Interest is then charged on $10.00 from the date of settlement (day x).

FIG. 4 depicts the movement of funds between different balances of the account 102 where a purchase has been made, and a merchant credit is provided. A merchant credit may be provided, for example, when a customer returns goods that were previously purchased. Similar to the example of FIG. 3, a purchase authorization is made for $10.00 and interest is charged on $10.00 from the date of settlement (day x). The merchant provides a credit of $10.00 on day y. Prior to the settlement date of the merchant credit, the Credit OTB remains at $40.00 and the Cardholder OTB remains at $140.00. Upon settlement (posting) of the merchant credit (day z), the Credit OTB is increased to $50.00 and the Cardholder OTB is increased to $150.00. The credit may be dated back to the date of the merchant credit authorization (day y) for interest-calculation purposes.

Referring now to FIG. 5, an example 500 is provided where a transaction is made, a merchant credit is provided, and a payment is made on the account. On an account with a credit limit of $50.00 and a prepaid account of $100.00, a purchase authorization is made for $19.50, thereby reducing the Credit OTB to $30.50. On day x, the purchase settles for $19.50, and a merchant credit authorization is received for $12.50. As described previously, the merchant credit authorization may be received after purchased goods are returned to the merchant. In this embodiment, because the purchases have been settled, but the merchant credit has not been settled, interest is charged on the full bucket balance of $19.50, and the $12.50 merchant credit is placed in the Pending OTB. On day y, the merchant credit settles, thereby subtracting $12.50 from the bucket balance and adding $12.50 to the Credit OTB. On day z, a $10.00 payment is received from the cardholder. Because the credit limit is only $50.00, $7.00 of the payment is applied to the Credit OTB, and the remaining $3.00 is applied to the Prepaid OTB. No interest can be charged until another purchase transaction is made.

Referring now to FIG. 6, an example 600 is provided where the transaction settlement amount exceeds the purchase authorization amount. When a purchase authorization is made for $47.50, the Credit OTB is reduced from $50.00 to $2.50. The Prepaid OTB remains at $100.00 because the purchase authorization was less than the original $50.00 Credit OTB. When the purchase settles, the settlement amount is increased to $53.50. Because the Settlement amount exceeds the credit limit of $50.00, the Credit OTB is reduced to $0.00, and the remaining $3.50 is deducted from the Prepaid OTB, thereby reducing the Prepaid OTB to $96.50. The Bucket Balance is increased to $50.00 to reflect the amount that must be paid by the cardholder in order to repay the amount of credit consumed. Interest is calculated on only $50.00, since the additional $3.50 is funded from the prepaid account.

Referring now to FIG. 7, an example 700 is provided where a purchase is made having an amount that exceeds the credit limit of the account. On an account with a credit limit of $50.00 and a prepaid account of $100.00, a purchase authorization is made for $60.00. In the present embodiment, the Credit OTB is initially reduced to −$10.00. The funds from the prepaid account are not used to cover the negative balance until settlement, so the Prepaid OTB remains at $100.00 during day 1. The negative Credit OTB reduces the Cardholder OTB to $90.00 and the bucket balance is not affected until settlement.

At day x, the $60.00 purchase settles and $10.00 is transferred from the Prepaid OTB to the Credit OTB to cover the $10.00 negative balance. The bucket balance is increased to $50.00. At day y, another purchase authorization is made for $50.00, and a $40.00 merchant credit or pending payment is received. Until the purchase settles, a balance of −$50.00 is recorded at the Credit OTB. A $40.00 merchant credit or pending payment is applied to the Pending OTB, and may adjust the bucket balance from $40.00 to $10.00. On day z, the $50.00 purchase and the $40.00 merchant credit settles, thereby increasing the bucket balance to its maximum allowed value of $50.00, adjusting the Credit OTB, and decreasing the Prepaid OTB by $10.00 to $80.00.

In one embodiment, the cardholder's monthly bill may be paid entirely on the merchant credits. In another embodiment, merchant credits are precluded from being counted as payments, thereby requiring the cardholder to make a monthly payment regardless of the balance or merchant credits.

In FIG. 8, an example 800 is provided showing the transfer of funds between different account balances to process transactions and a pending payment. Beginning with a Cardholder OTB of $150.00, a purchase authorization is made for $130, thereby reducing the Credit OTB to negative $80.00. Because the purchase authorization has not settled, the Prepaid OTB and the bucket balance remain unchanged. On day x, the $130.00 purchase authorization settles for $160.00, and a payment is received from the cardholder for $60.00. The $60.00 payment may have a hold placed on it, which is why the payment it does not post until day z. The system deducts $100.00 from the Prepaid OTB and adds $10.00 to the Pending OTB to cover for the $160.00 purchase settlement. Also on day x, another purchase authorization is made for $20.00. In the embodiment shown, the system uses an additional $20.00 from pending transactions (Pending OTB) to cover for the $20.00 purchase authorization. In another embodiment (not shown), the $20.00 purchase may be applied to the Credit OTB, resulting in a Credit OTB balance of −$20.00. The Credit and Prepaid OTB are $0.00 and no more transactions can be attempted or will be allowed until the $60.00 payment posts.

On day y, the $20.00 purchase authorization settles for $20.00. In the embodiment, shown, no other changes are necessary in the OTBs or bucket balances. However, in the embodiment where the $20.00 purchase authorization was applied to the Credit OTB resulting in a Credit OTB balance of −$20.00, the system may add $20.00 to the balance of the Pending OTB to offset the −$20.00 balance in the Credit OTB, resulting in a $0.00 balance in the Credit OTB and a $30.00 balance in the Pending OTB, as shown.

On day z, the pending payment of $60.00 is posted. $30.00 of the Posted payment is applied to the Pending OTB, and the remaining $30.00 is applied to the bucket balance. The remaining payment decreases the bucket balance by $30.00 to a total of $20. The prepaid OTB remains at $0.00, which leaves the cardholder with a Credit OTB and overall OTB of $30.00.

FIG. 9 provides an example 900 illustrating the transfer of funds between various account balances for processing various transactions with a pending payment and a pending merchant credit. Beginning with a credit limit of $50.00, a prepaid account of $100.00 and a Cardholder OTB of $150.00, a purchase authorization is made for $130, thereby reducing the Credit OTB to −$80.00. Because the purchase authorization has not settled, the Prepaid OTB and the bucket balance remain unchanged. On day x, the $130.00 purchase authorization settles for $160.00, and a payment is received from the cardholder for $20.00, which may include a hold. In the embodiment shown, $80.00 is taken from the Prepaid OTB to cover the negative balance in the Credit OTB, leaving a bucket balance of $80.00. An additional $20.00 is taken from the Prepaid OTB to reduce the bucket balance to $60.00 (i.e., $10.00 over the credit limit). In one embodiment, the $20.00 purchase authorization and the $20.00 pending transaction offset one another in the Pending OTB. The Credit and Prepaid OTB are $0.00 and no more transactions can be attempted or will be allowed until additional payments or credits are received.

On day y, the pending payment of $20.00 posts, thereby offsetting the negative balance in the Credit OTB. A merchant credit is also received for $12.50, with n hold days. The merchant credit will initially be deposited in the Pending OTB. However, $10.00 of the merchant credit may be transferred to the bucket balance in order to bring the bucket balance down to the $50.00 credit limit. $2.50 remains in the Pending OTB, allowing the system to calculate interest on the bucket amount of $50.00. On day z, the $12.50 merchant credit posts, validating the previous transfer of $10.00 from the Pending OTB to the bucket balance, and further transferring the remaining $2.50 from the Pending OTB to the Prepaid OTB.

Embodiments of the present invention also provide for methods and systems for providing a financial instrument that possesses both unsecured credit features and prepaid features. A user may obtain an unsecured credit account, typically for a low credit amount. The user may also obtain a secured account, such as a prepaid cash account, that is tied to the unsecured credit account. A purchase may be made using a financial instrument linked to the unsecured credit account, until a credit limit is reached. If a purchase requires an amount that exceeds the credit limit, the user may manually move the excess amount from a separate account to the unsecured credit account.

As discussed previously, the account 102 is configured such that when the account holder 104 attempts to make a purchase, thereby generating a purchase authorization for a given amount, a determination is first made as to whether the available credit 116 stored in the credit portion 110 is sufficient to fund the requested amount for the purchase. If the purchase amount can be funded by the available credit 106 (i.e., without exceeding the credit limit 114), the purchase is funded in a similar manner as a traditional credit card, and the amount of the purchase is deducted from the available credit 116 stored in the credit portion 110. If the amount of the purchase does not exhaust the credit limit 114, the account holder 104 may make additional purchases up to the credit limit 114.

However, in some embodiments, the credit limit 114 may be unsecured. That is, unlike the secured credit embodiments discussed previously, the cash balance 118 is not automatically used to cover any purchase price that exceeds the credit limit 114. Rather, once the credit limit 114 has been exhausted, the account 102 is configured to not allow additional purchases. Of course, the account holder 104 may pay off the amount of the purchase, or a portion thereof, along with any applicable interest so that the available credit 116 is lower than the credit limit 114. Once done, the account holder 104 may make additional purchases up to the credit limit 114.

It will be appreciated, however, that there may be circumstances when the account holder 104 needs to access credit 110 that exceeds the credit limit 114. For example, many Point-Of-Sale (POS) transactions are set up only for credit transactions and not for debit or prepaid transactions. In such cases, the account holder 104 would typically not be able to make the desired purchase without some type of prepayment to financial institution 120.

Advantageously, the principles of the present invention allow the user to access his or her cash account 108 and manually move money from cash balance 118 to credit account 110. In this way, the account holder 104 is able to access needed credit as he or she builds up a credit history without having to prepay to get credit. That is, the unsecured credit embodiments allow a user who does not desire or who is unable to make a large prepayment to the cash account 108 to still obtain some level of credit. However, since the credit is unsecured, the credit limit may not be exceeded without some form of prepayment to the financial institution 120.

Returning to FIG. 1, the system 100 may further include an account access 130 that is tied to the account 102. The account access 130 may be a computer with internet access to the account 102, although any other reasonable way to access account 102 is contemplated by the principles of the present invention. In some embodiments, the computer may be a desktop computer, a hand held computer, a cell phone, a PDA, and the like.

The account holder 104 may use account access 130 to access the account 102, specifically cash account 108. The account holder 104 may then direct that a specified amount of cash balance 118 be moved to the credit account 110. As long as the specified amount does not exceed the cash balance 118, then the money is moved to the credit account. In some embodiments, the account 102 may include safeguards to ensure that any money that the account holder 104 desires to transfer has not been previously allocated for another financial transaction. This may help to prevent the cash balance 118 from being overdrawn. In additional embodiments, the account holder 104 may be able to use account access 130 to schedule the transfer of the specified amount at a time prior to the actual use of the funds. In this way, the account holder 104 may ensure that a sufficient available credit 116 exists prior to making a purchase or the like.

As will be appreciated, moving the specified amount of cash balance 118 to credit portion 110 may raise the available credit 116. The account holder 104 is then able make a purchase up to the available credit 116 as desired. As mentioned, the account holder 104 will be able to build up a credit history without the need for prepaid or secured credit.

An example will now be explained. Suppose the account holder 104 had account 102 with a cash portion 108 having a cash balance 118 of $500 and a credit portion 110 with a credit limit 114 of $50 and an available credit 116 of $50. If the account holder 104 desired to purchase an item for $40, then he or she would be able to make a credit transaction as previously discussed with no need to access cash portion 108.

If the account holder 104 desired to purchase an item that cost $400, he or she would need to use account access 130 to access account 102. The account holder 104 would then need to transfer at least $350 from cash account 108 to credit account 110. Since $350 was less than the $500 cash balance 118, this amount could be transferred to the credit portion 110. The account holder 104 could then make the $400 using a financial instrument such as card 106 tied to the credit 110 without any problems.

However, if the account holder 104 desired to subsequently purchase an item that cost $200, he or she would need to provide more money to the cash account 108 in order to make the purchase. That is, as the credit and cash limits available to the account holder 104 only equal $550, the user would only have $150 available after making the $400 purchase and thus would not be able to make the $200 purchase. In addition, since $350 of the cash balance 118 was allocated to the first purchase, the account 102 would not allow more than the remaining $150 to be allocated to the $200 purchase. Of course, as mentioned, the account holder 104 may provide more money to the cash account 108 or pay the financial institution 120 the $50 needed in order to make the $200 purchase.

Figure 10:
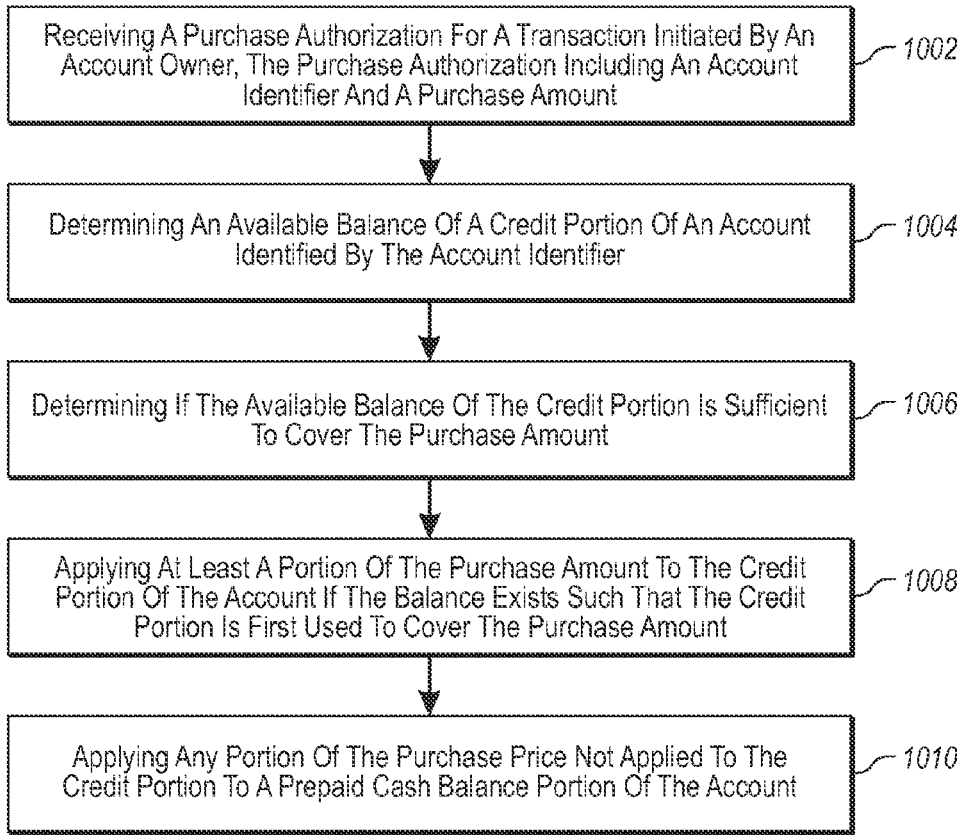
FIG. 10 illustrates a flowchart of a method for a financial institution to process a financial transaction initiated by an account user using a financial instrument tied to both a credit portion and a prepaid cash portion.

Turning now to FIG. 10, a method 1000 for a financial institution to process a financial transaction initiated by the account user using a financial instrument is shown. The method may be performed in a system that includes the financial instrument such as a credit card or the like that is tied to the user account. The user account may include both a credit portion and a pre-paid portion that are used in performing the financial transaction.

The method includes receiving 1002 a purchase authorization for a transaction initiated by an account owner. The purchase authorization may include an account identifier and a purchase amount. For example, a purchase authorization such as those illustrated in FIGS. 2-9 may be initiated by the account owner 104. The purchase authorization may further include an account identifier and purchase amount such as those illustrated in FIGS. 2-9 that specify how the purchase amount is allocated between the credit portion and the prepaid cash portion.

The method also includes determining 1004 an available balance of a credit portion of an account identified by the account identifier and determining 1006 if the available balance of the credit portion is sufficient to cover the purchase amount. For example, the system may determine if the available credit 116 exists and if so, is the available credit 116 sufficient to cover the purchase price.

The method further includes applying 1008 at least a portion of the purchase amount to the credit portion of the account if the available balance exists. This ensures that the credit portion is used first. For example, as described in detail above the purchase amount is first applied to the credit portion 110 if the available credit 116 is sufficient as determined in act 1006.

The method further includes applying 1010 any portion of the purchase price not applied to the credit portion to the prepaid cash balance portion of the account. For example, as described in detail above any portion of the purchase amount not applied to credit portion 110 is obtained from the prepaid cash portion 108.

Figure 11:
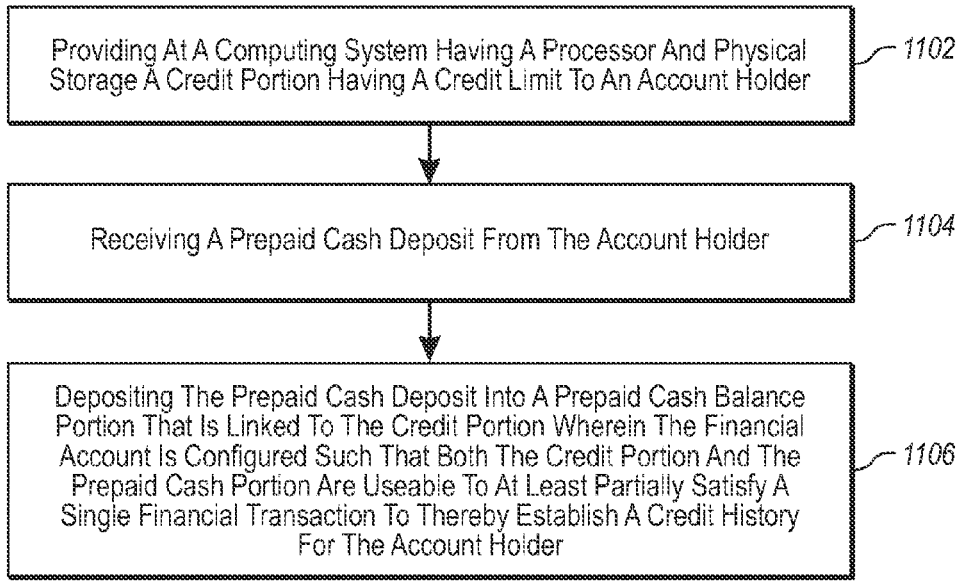
FIG. 11 illustrates a flowchart of a method for establishing a financial account having both a credit portion and a prepaid cash portion.

FIG. 11 illustrates a method 1100 for establishing the financial account. The method may be performed in a system that includes the financial instrument such as a credit card or the like that is tied to the user account. The user account may include both a credit portion and a pre-paid portion that are used in performing the financial transaction The method includes providing 1102 at a computing system having a processor and physical storage a credit portion having a credit limit to an account holder. For example, as discussed above the account 102 may have a credit portion 110 that is provided to the account holder 104.

The method also includes receiving 1104 a prepaid cash deposit from the account holder and depositing 1106 the prepaid cash deposit into a prepaid cash balance portion that is linked to the credit portion. For example, as discussed above the account 102 may include a prepaid cash portion 108. The account holder 104 may provide prepaid funds that may be deposited into the cash portion 108. This allows both the credit portion and the prepaid cash portion of account 102 to be used by the account holder 104 in a single financial transaction. As previously mentioned, using both an account with both credit and prepaid features in a single transaction allows the account holder to establish a credit history while providing a level of security to the financial institution providing the credit.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 12:
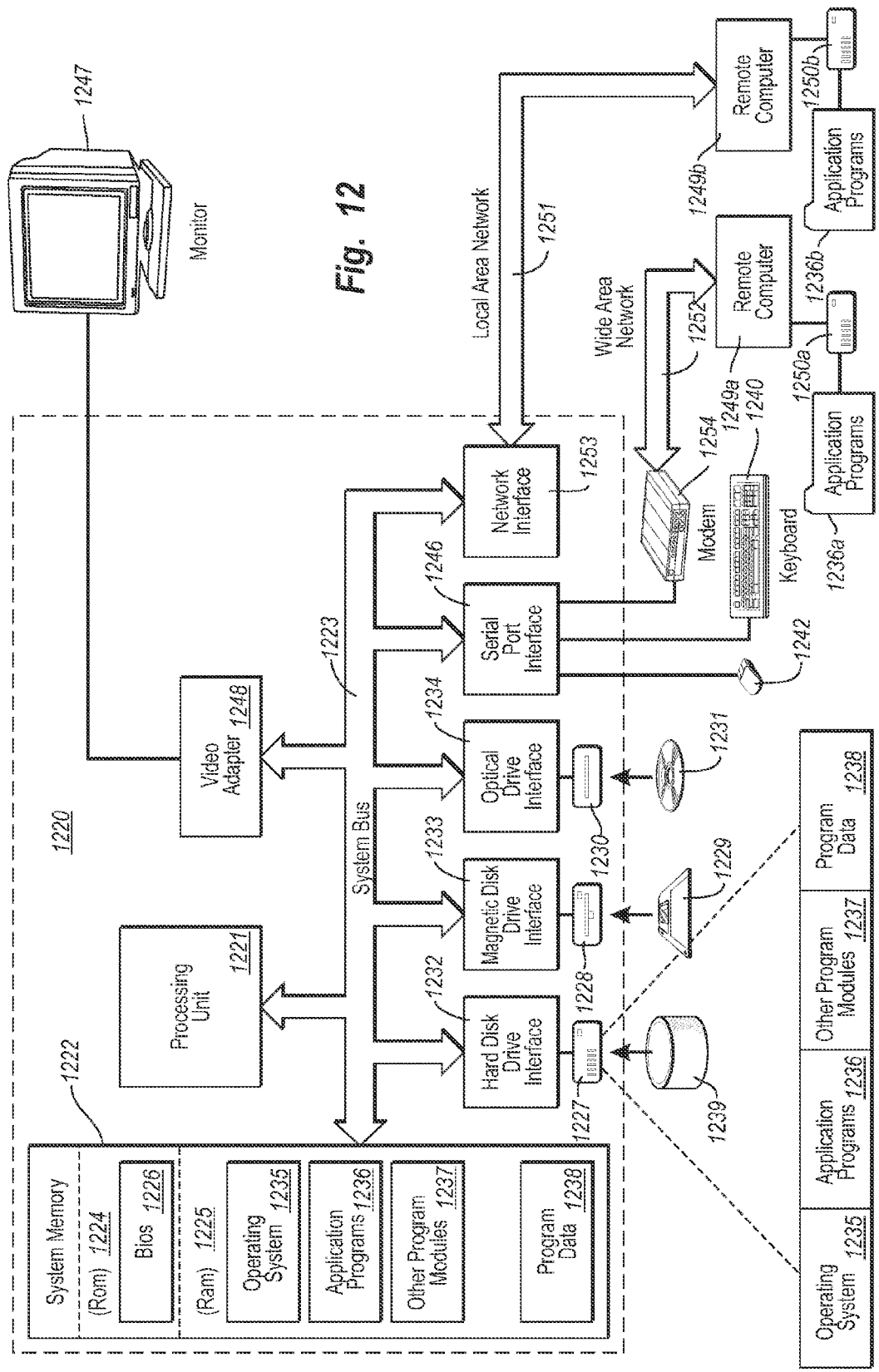
FIG. 12 illustrates an exemplary environment and system for performing the embodiments disclosed herein.

FIG. 12 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 12, an example system for implementing the invention includes a general purpose computing device in the form of a conventional computer 1220, including a processing unit 1221, a system memory 1222, and a system bus 1223 that couples various system components including the system memory 1222 to the processing unit 1221. It should be noted however, that as mobile phones become more sophisticated, they are beginning to incorporate many of the components illustrated for conventional computer 1220. Accordingly, with relatively minor adjustments, mostly with respect to input/output devices, the description of conventional computer 1220 applies equally to mobile phones. The system bus 1223 may be any of several types of bus structures including a memory bus or memory controller, a peripheral bus, and a local bus using any of a variety of bus architectures. The system memory includes read only memory (ROM) 1224 and random access memory (RAM) 1225. A basic input/output system (BIOS) 1226, containing the basic routines that help transfer information between elements within the computer 1220, such as during start-up, may be stored in ROM 1224.

The computer 1220 may also include a magnetic hard disk drive 1227 for reading from and writing to a magnetic hard disk 1239, a magnetic disk drive 1228 for reading from or writing to a removable magnetic disk 1229, and an optical disc drive 30 for reading from or writing to removable optical disc 1231 such as a CD-ROM or other optical media. The magnetic hard disk drive 1227, magnetic disk drive 1228, and optical disc drive 1230 are connected to the system bus 1223 by a hard disk drive interface 1232, a magnetic disk drive-interface 1233, and an optical drive interface 1234, respectively. The drives and their associated computer-readable media provide nonvolatile storage of computer-executable instructions, data structures, program modules and other data for the computer 1220. Although the exemplary environment described herein employs a magnetic hard disk 1239, a removable magnetic disk 1229 and a removable optical disc 1231, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 1239, magnetic disk 1229, optical disc 1231, ROM 1224 or RAM 1225, including an operating system 1235, one or more application programs 1236, other program modules 1237, and program data 1238. A user may enter commands and information into the computer 1220 through keyboard 1240, pointing device 1242, or other input devices (not shown), such as a microphone, joy stick, game pad, satellite dish, scanner, or the like. These and other input devices are often connected to the processing unit 1221 through a serial port interface 1246 coupled to system bus 1223. Alternatively, the input devices may be connected by other interfaces, such as a parallel port, a game port or a universal serial bus (USB). A monitor 1247 or another display device is also connected to system bus 1223 via an interface, such as video adapter 1248. In addition to the monitor, personal computers typically include other peripheral output devices (not shown), such as speakers and printers.

The computer 1220 may operate in a networked environment using logical connections to one or more remote computers, such as remote computers 1249*a* and 1249*b*. Remote computers 1249*a* and 1249*b* may each be another personal computer, a server, a router, a network PC, a peer device or other common network node, and typically include many or all of the elements described above relative to the computer 1220, although only memory storage devices 1250*a* and 1250*b* and their associated application programs 1236*a* and 1236*b* have been illustrated in FIG. 12. The logical connections depicted in FIG. 12 include a local area network (LAN) 1251 and a wide area network (WAN) 1252 that are presented here by way of example and not limitation. Such networking environments are commonplace in office-wide or enterprise-wide computer networks, intranets and the Internet.

When used in a LAN networking environment, the computer 1220 is connected to the local network 1251 through a network interface or adapter 1253. When used in a WAN networking environment, the computer 1220 may include a modem 1254, a wireless link, or other means for establishing communications over the wide area network 1252, such as the Internet. The modem 1254, which may be internal or external, is connected to the system bus 1223 via the serial port interface 1246. In a networked environment, program modules depicted relative to the computer 1220, or portions thereof, may be stored in the remote memory storage device. It will be appreciated that the network connections shown are exemplary and other means of establishing communications over wide area network 1252 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a financial instrument, the financial instrument tied to a single financial account comprising a credit portion and a prepaid portion that may be accessed by an account holder in a financial transaction, a method for processing the financial transaction, the method comprising:
   funding the financial account with a cash balance provided by the account holder, an amount of the cash balance comprising the prepaid portion of the financial account;
   providing the financial instrument enabling the account holder to access the credit portion and the prepaid portion of the financial account, the credit portion linked to the prepaid portion in a single physical storage media;
   receiving at a computing system a purchase authorization for the financial transaction initiated by the account holder, the purchase authorization comprising a purchase amount and an identifier for the financial account;
   determining at the computing system an available balance of the credit portion of the financial account;
   if the purchase amount exceeds the available balance of the credit portion, funding the financial transaction with an amount less than or equal to the available balance of the credit portion;
   funding a remaining portion of the purchase amount with the prepaid portion of the financial account;
   receiving a prepaid cash deposit from an account holder; and
   applying the prepaid cash deposit to the prepaid cash balance portion until the prepaid cash balance satisfies a minimum amount and any amount of the prepaid cash deposit not applied to the prepaid cash balance is applied to at least partially pay an amount of the credit limit that has been used by the account holder.

2. The method of claim 1, wherein funding a remaining portion of the purchase amount with the prepaid portion of the financial account comprises automatically funding the remaining portion of the purchase amount with available cash from the prepaid portion such that the prepaid portion functions as a security for the credit portion.

3. The method of claim 1, further comprising enabling the account holder to manually move an amount greater than or equal to the remaining portion of the purchase amount from the prepaid portion to the credit portion if the purchase amount exceeds the available balance of the credit portion.

4. The method of claim 1, further comprising:
   prior to funding a remaining portion of the purchase amount with the prepaid portion of the financial account, determining if the cash balance has been previously allocated for a different financial transaction; and
   if the cash balance has been previously allocated, denying the transaction if other funds in the prepaid portion are not available for use in the financial transaction.

5. The method of claim 1, further comprising:
   prior to funding a remaining portion of the purchase amount with the prepaid portion of the account, determining if the cash balance remaining after being applied will satisfy a minimum amount specified by the financial institution; and
   if the cash balance remaining after being applied will not satisfy a minimum amount specified by the financial institution, denying the transaction.

6. An account system comprising:
   one or more processors;
   a single storage media for maintaining each of:
      a credit portion having a credit limit associated with an account; and
      a prepaid cash balance portion associated with the account, wherein the credit portion and the prepaid cash balance portion are each tied to a financial instrument that enables access to the credit portion and the prepaid cash balance portion in making purchases;
   wherein the account system is configured to perform the following:
   receive a purchase authorization for a transaction initiated by an account owner, the purchase authorization including an account identifier and a purchase amount;
   determine if the credit portion is sufficient to cover the purchase amount;
   if the purchase amount exceeds the available balance of the credit portion, fund the financial transaction with an amount less than or equal to the available balance of the credit portion;
   fund a remaining portion of the purchase amount with the prepaid cash balance portion of the account;
   receive a prepaid cash deposit from an account holder; and apply the prepaid cash deposit to the prepaid cash balance portion until the prepaid cash balance satisfies a minimum amount and any amount of the prepaid cash deposit not applied to the prepaid cash balance is applied to at least partially pay an amount of the credit limit that has been used by the account holder.

7. The account system of claim 6, wherein the remaining portion of the purchase amount not funded with the credit portion is automatically funded by the prepaid cash balance portion such that the prepaid cash balance portion acts a security for the credit portion.

8. The account system of claim 6, wherein the remaining portion of the purchase amount not funded with the credit portion is manually moved from the prepaid cash portion to the credit portion prior to being applied by the account owner.

9. The account system of claim 6, wherein the minimum amount is a required minimum account balance for the prepaid cash balance portion as specified by a financial institution associated with the account system.

10. The account system of claim 6, wherein the account system is configured to further perform the following:
   prior to funding the remaining portion of the purchase amount with the prepaid cash balance portion, determining if the prepaid cash balance portion remaining after the funding will satisfy a minimum amount specified by a financial institution providing the account; and
   if the cash balance remaining after the funding will not satisfy the minimum amount specified by the financial institution, denying the purchase authorization for the transaction.

* * * * *